United States Patent [19]

Peter

[11] 4,158,403
[45] Jun. 19, 1979

[54] IMPACT OR SHOCK ABSORBING DEVICE FOR AUTOMOBILE SEAT BELTS

[76] Inventor: Oskar E. Peter, Schlosstrasse 9/1, D-7129 Brackenheim, Fed. Rep. of Germany

[21] Appl. No.: 874,658

[22] Filed: Feb. 2, 1978

[30] Foreign Application Priority Data

Mar. 31, 1977 [DE] Fed. Rep. of Germany ....... 2714360

[51] Int. Cl.² .............................................. F16F 7/12
[52] U.S. Cl. .................................... 188/1 C; 74/492; 297/471; 280/805
[58] Field of Search ........................ 188/1 C; 280/746; 74/492; 293/DIG. 3; 213/1 A

[56] References Cited

FOREIGN PATENT DOCUMENTS 1282365 11/1968 Fed. Rep. of Germany .......... 188/1 C
1162807 8/1969 United Kingdom .................... 188/1 C Primary Examiner—George E. A. Halvosa Attorney, Agent, or Firm—Frishauf, Holtz, Goodman & Woodward

[57] ABSTRACT

A tubular housing has one end closed by a cover plate and two adjoining inner conical or tapered surfaces centrally disposed therein; the innermost surface has a non-self-binding taper, while the adjacent one has a self-binding taper. The surfaces cooperate with three rings, two of which are solid rings having tapered circumferential walls arranged in the non-self-binding section, i.e., the one closed by the cover plate. Impact energy, for example due to an abrupt deceleration of a car during braking emergency or collision, is transmitted to the system via a centrally arranged shaft which is guided loosely by central bores in the rings and held against the cover plate by a compression spring. Upon impact, the shaft displaces first the split ring and, in dependence with the magnitude of the impact energy, then the other solid rings against the force of the compression spring and frictional force acting between the rings and the tapered surface of the housing. The material of construction of the housing and/or the rings can be bronze, steel, or berryllium or berryllium alloy.

10 Claims, 1 Drawing Figure

U.S. Patent  Jun. 19, 1979  4,158,403
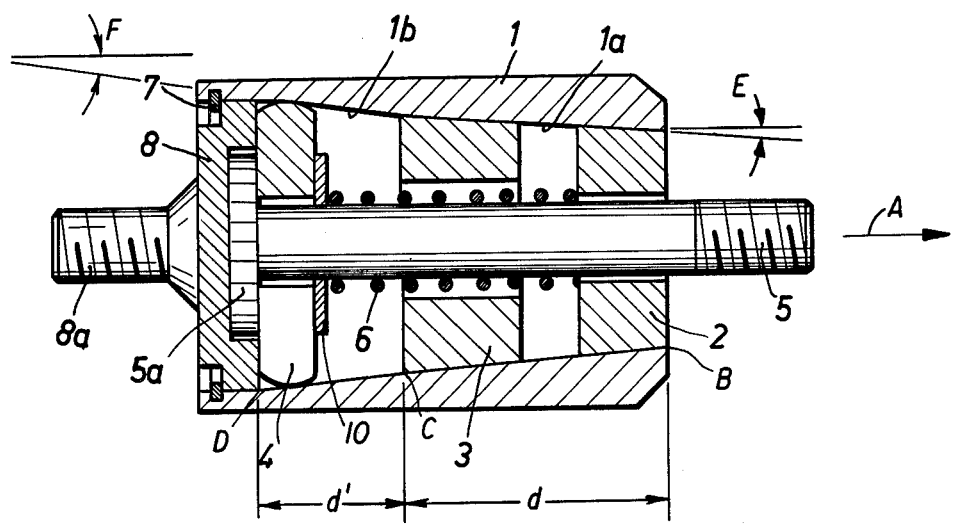

IMPACT OR SHOCK ABSORBING DEVICE FOR AUTOMOBILE SEAT BELTS

This invention relates to an impact or shock absorbing device and, more particularly, it is concerned with an impact or shock absorbing device for use in conjunction with a car seat belt.

BACKGROUND AND PRIOR ART

A known impact absorbing device for use with a car seat belt is shown in German Patent DT-PS No. 1,245,223. This device is comprised of a tubular housing having a conical or tapered bore which receives a conical insert. Upon impact, or rapid deceleration, the conical insert locks in the conical bore and cannot, under normal conditions, be unlocked manually from the locked position. Thus, the assembly is rendered useless until it is repaired in a repair shop. While the adjustment means remains unrepaired, the seat belt is not snug which, however, it should be in order to be effective in preventing serious injuries during an accident. Once locked, the device does not allow for some movement by the user. Another drawback of this device resides in the abrupt locking response during impact leading to potentially severe injuries to the user.

THE INVENTION

It is an object to provide an impact absorbing device which will ensure, upon impact, for example due to abrupt deceleration, a progressively increasing, friction-buffered shock absorption effect, while capable of accepting a considerable impact energy.

Briefly, a tubular housing has first and second conical or tapered bore sections inside to receive, in spaced-apart relation, two self-locking solid rings having each conical surfaces corresponding to the taper of one bore section, and a third ring, in form of split ring having a rounded or part spherical circumference within the second bore section. All three rings are concentrically located on a central shaft which is itself arranged concentrically with respect to the housing. The shaft is maintained under pressure against a closure plate terminating the second conical or tapered bore section by a compression spring disposed between the split ring and the foremost solid ring. The first bore section has a self binding taper, the other is non-self-binding.

The drawing shows in a single FIGURE longitudinal cross-section the device in rest, or non-operated state.

A tubular housing 1 of generally uniform outer diameter has two different inner surfaces, a first self-bending conical section 1a extending between planes B and C and having a taper angle E and a second non-binding conical section 1b extending between planes C and D and having taper angle F. Section 1a of length d is terminated by a ring 2 and also receives a similar ring 3 while the section 1b of length d' receives a split ring 4. The ring 4 has an outer circumference or diameter with curved and rounded shoulders while the rings 2 and 3 have a conical configuration so as to cooperate with the conical or tapered section 1a.

An actuating rod or shaft 5 extends centrally, with play, through the rings 2, 3, and 4 and into the housing. The rod 5 has an actuating face plate 5a engaging ring 4; its free end is threaded.

Section 1b of housing 1 is closed by a closure plate 8 having on its outer face a centrally arranged threaded stud 8a. Closure plate 8 is secured in a groove or the like recess in the wall of housing 1 by a retaining ring 7, and closes off the device to form a self contained, closed unit. A helical, stressed compression spring 6 coaxially surrounds the shaft 5. The spring 6 can either rest on the face of the ring 4 directed towards the solid rings 2 and 3, or, as shown in the drawing, it can rest on a washer 10 or similar disc interposed between the spring 6 and the split ring 4. The spring extends through a central bore through ring 3 and holds the ring 4 and bolt 5 in the rest position as shown. The spring 6 is of generally circular overall configuration and the cross-section of the wire from which the helical windings are formed can be round or rectangular; preferably it is square.

Thus, an impact dampening unit has been provided which comprises on a common longitudinal axis: a shaft having a face plate at the inside face of which is provided a split first ring 4, a pair of solid rings 2 and 3 are provided as well on the shaft whereby rings 2 and 4 are maintained in spaced relation by the action of a compression spring 6. The spring retains the assembly in a rest position during which the face plate 5a and the split ring 4 will be held against the inside face of the closure plate 8. During this state the central floating ring 3 will be maintained slidingly in section 1a approximately as shown in the drawing. The circumferences of the three rings cooperate with the conical sections of the housing 1 as will be described in greater detail below.

The unit can be mounted in conjunction with a car seat belt as follows: threaded stud 8a connects to an intermediate connecting link, not shown, to the body of a car, i.e., the floor or chassis portion of the car body, not shown. The threaded end of shaft 5, in turn, is interconnected, via another connecting link, not shown, to the belt portion, not shown, of the safety belt assembly.

Operation: Three possible conditions are of importance: (a) emergency braking or deceleration, or collision, under low force conditions, e.g., at driving velocities of between approximately 20 to 40 km/h; (b) emergency braking or collision resulting in intermediate loading, e.g., at a velocity of approximately 60 km/h; and (c) emergency braking or collision from a velocity greater than about 80 km/h.

Under condition (a) the impact or deceleration is translated into a pulling or tensile force acting in the direction of arrow A on shaft 5. Thus, the split ring 4 is actuated by the face plate 5a while spring 6 is compressed. The rounded shoulders of the circumference of the split ring 4 ride on the conical wall section 1b in the direction of arrow A and the kinetic energy is absorbed and reduced toward zero due to the frictional contact between the circumference of split ring 4 and the conical wall of section 1b. The reaction forces and the compressional forces accumulated by the spring 6, return the rod 5, together with the split ring 4, to the rest position upon release of the impact force.

Under condition (b), in addition to the split ring 4, also ring 3 will be engaged, i.e., displaced by the forces acting in the direction of arrow A and it, in turn, will dampen the impact. Upon dissipating the very considerable impact force, the split ring 4 is returned as described while the ring 3 necessarily has to be freed by external manipulation, i.e., by threading a tool on the threaded end of rod 5 to the ring 2 towards ring 3 and release ring 3 from the hold exerted by the self-holding conical wall section 1a.

Under condition (c), i.e., upon collision or abrupt deceleration from a speed of greater than about 80 km/h, the tensile force exerted on the shaft is further retarded by ring 2 such that all three rings, namely, 2 and 3 and 4, are face to face with respect to each other during impact and in frictional contact with their respective wall section until the forces of the deceleration are alleviated. It is necessary to rebuild the unit after it has been subjected to such a strain in order to clear the conical sections 1a and 1b.

A suitable adjustment of the effectiveness of the system can be achieved by varying the width of the radial gap between the ends of the split ring 4, i.e., a greater compression of the ring is possible when a larger gap is formed and, conversely, the smaller the gap is formed, the lesser will be the contraction that can be achieved. It will be appreciated that the split ring, following traversal of a particular distance in the conical section 1b, will become compressed such that it will function as a solid ring.

The ring 4 will, upon impact, normally, traverse the greatest distance of the three rings in the system. Preferably, it is made of steel and the housing can be formed of bronze in order to make use of the desirable frictional relationships between the two materials.

In another embodiment, the main components of the device, namely, the housing 1, the split ring 4 and the two solid lrings 2 and 3 are made of beryllium or an alloy containing beryllium. Thus, use can be made of the lower modulus of elasticity ($E=1.2\times 10^6$ kp/cm$^2$) of the beryllium alloy compared to that of steel ($E=2.1\times 10^6$ kp/cm$^2$) and an appreciably greater elastic radial expansion of the housing, which is subjected to tensional forces, can be attained. This applies also to the three rings in the housing which are subjected to compressional forces. Upon actuation of shaft 5 in the direction indicated by arrow A, this will be a proportionate increase in load capacity that can be achieved by the system resulting in an increase in the distance that is traversed by the compression spring 6. This can be expressed in the following equations:

$$A=(P\times f)/2=(V\times G^2/(2\times E)$$

wherein: A = load capacity; P = axially directed force; f = distance of travel by the spring; V = volume of the rings; G = acceptable tensile and compressional strength of the housing and the three rings; and E = modulus of elasticity of the material of construction of the housing and the three rings.

The device in accordance with the present invention provides a system which is based on frictional retardation in three stages of a considerable impact energy, for example in a seat belt assembly. The device is independent of the magnitude of the velocity at impact and is effective in preventing injuries to passengers when in use because of its high energy absorption. The split ring with its rounded shoulders permits, on the one hand, a soft and elastic cushioning effect to be attained by the system and, on the other hand, it allows a relative freedom of movement by the passenger wearing the seat belt system without diminishing its safety features. Upon response of the unit to emergency conditions, however, the split ring 4 will close to form a complete, closed ring and then operate as a closed ring in a conical housing.

Various changes and modifications may be made within the scope of the inventive concept.

In an example, and for use as an automobile seat restraint, a device was constructed as follows:
outer diameter of housing: 56 mm
inner diameter of housing at B: 36 mm
inner diameter of housing at C: 40.6 mm
inner diameter of housing at D: 46.6 mm
a suitable taper angle E for bronze-to-bronze contact is: 3°
a taper angle F for steel-to-bronze contact is: 7°
distance d: 46 mm
distance d': 25 mm
material of housing 1: beryllium alloy
material of ring 2: beryllium alloy
material of ring 3: beryllium alloy material of ring 4: high tensile strength steel $G=1.200$ N/mm$^2$.

I claim:

1. Impact or shock absorbing device for use in conjunction with a car seat belt assembly, comprising
    a tubular housing (1) with a closed end (8) having a first self binding conical locking section (1a) and a second conical non-self-binding section (1b) formed in said housing;
    a first solid ring (2) disposed towards the open end of said housing within said first conical section (1a), said first solid ring having a central bore and a tapered circumference tapering in the same direction as said first conical section (1a) and in correspondence therewith;
    a second solid ring (3) slidingly disposed within said first conical section, said solid ring having a central bore and a tapered circumference tapering in the same direction as said first conical section (1a) and in correspondence therewith;
    a split ring (4) disposed within said second conical section (1b), said split ring having a central bore and a rounded circumference;
    a central shaft (5), having a face plate (5a), disposed longitudinally within the bores of said rings (2, 3, 4), said face plate abutting against the closed end of said housing; and
    a compression spring (6) wound around said shaft and extending through said second solid ring (3), said spring being in contact with said split ring and said first solid ring (2).

2. A Device as defined by claim 1, wherein said spring (6) is a helical spring having a square cross-section.

3. A device as defined by claim 1, wherein said solid rings (2, 3), said split ring (4) and said housing (1) are formed of a material comprising at least one of a beryllium alloy, or berryllium bronze.

4. A device as defined by claim 1, wherein said housing is closed by a cover plate (8) held in position by a retaining ring (7).

5. A device as defined by claim 1, wherein at least one of said rings (2, 3, 4) are made of steel and said housing is made of bronze.

6. A device as defined by claim 1, wherein the housing (1) is made of bronze, and the split ring (4) is made of steel.

7. A device as defined by claim 1, wherein the taper angle of the self-binding section (1a) is in the order of about 3 degrees.

8. A device as defined by claim 1, wherein the taper angle on the non-self binding section (1b) is in the order of about 7 degrees.

9. A device as defined by claim 8, wherein the taper angle of the self-binding section (1a) is in the order of about 3 degrees.

10. A device as defined by claim 9, wherein at least one of said rings (2, 3, 4) are made of steel and said housing is made of bronze.

* * * * *